United States Patent [19]

Bridges et al.

[11] Patent Number: 5,205,356
[45] Date of Patent: Apr. 27, 1993

[54] WELL STARTER HEAD

[75] Inventors: Charles D. Bridges; Lawrence A. Eckert, both of Houston, Tex.; Dale B. Marietta, Singapore, Singapore

[73] Assignee: ABB Vetco Gray Inc., Houston, Tex.

[21] Appl. No.: 772,827

[22] Filed: Oct. 7, 1991

Related U.S. Application Data

[63] Continuation-in-part of Ser. No. 634,465, Dec. 27, 1990, abandoned.

[51] Int. Cl.⁵ .............................................. E21B 33/03
[52] U.S. Cl. .................................... 166/85; 166/75.1; 166/96; 285/23; 285/323; 285/348
[58] Field of Search ............... 166/379, 85, 75.1, 82, 166/92, 96; 285/23, 339, 341, 348, 917, 323, 337, 374, 375

[56]  References Cited

U.S. PATENT DOCUMENTS

| | | | |
|---|---|---|---|
| 1,662,311 | 3/1928 | Hamer | 166/92 X |
| 2,075,947 | 4/1937 | Kennedy | 285/166 |
| 2,715,536 | 8/1955 | Schuptrine et al. | 285/341 X |
| 2,832,615 | 4/1958 | Summers | 285/374 X |
| 2,962,096 | 11/1960 | Knox | 166/75 |
| 3,010,740 | 11/1961 | Dilley | 285/341 |
| 3,316,963 | 5/1967 | Boldrick et al. | |
| 3,427,048 | 2/1969 | Brown | 285/18 |
| 3,552,781 | 5/1969 | Helland | 285/322 |
| 3,558,160 | 1/1971 | Falkner | 285/18 |
| 4,142,739 | 3/1979 | Billingsley | 285/18 |
| 4,239,266 | 12/1980 | Mynhier | 285/323 |
| 4,290,632 | 9/1981 | Manchester, Jr. et al. | 285/323 |
| 4,711,426 | 12/1987 | Bodnar | 285/323 X |
| 4,867,488 | 9/1989 | Jones | 285/328 |
| 4,878,698 | 11/1989 | Gilchrist | 285/342 |
| 4,932,472 | 6/1990 | Boehm, Jr. | 166/208 |
| 5,037,144 | 8/1991 | Peting et al. | 285/321 |
| 5,056,830 | 10/1991 | Reaux | 285/15 |

FOREIGN PATENT DOCUMENTS

| | | | |
|---|---|---|---|
| 1522050 | 3/1968 | France . | |
| 480825 | 10/1975 | U.S.S.R. | 166/379 |

Primary Examiner—Hoang C. Dang
Attorney, Agent, or Firm—James E. Bradley

[57]  ABSTRACT

A connector for connecting a tubular starter head to a casing of a well allows connection without special tools. The tubular head has an annular recess extending upward from its lower end. The connector includes a seal actuating ring and a slips actuating ring, one of the rings having a recess. A seal ring locates in one of the recesses and slips locate in the other recess. Upward movement of one of the actuating rings sets either the slips or the seal ring first while the other remains unset. Then upward movement of the other actuating ring sets the other.

6 Claims, 4 Drawing Sheets

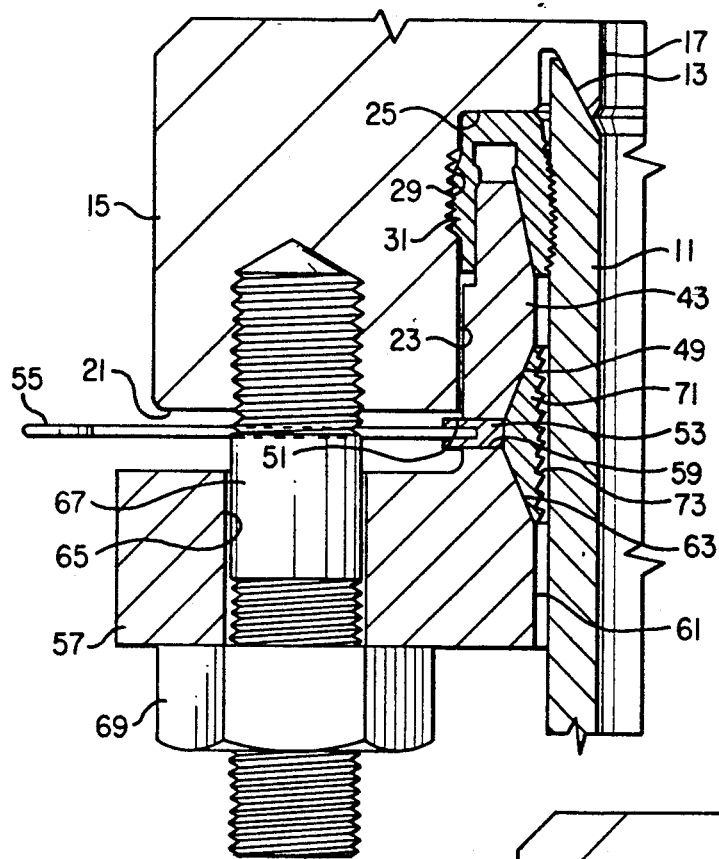
FIG. 3
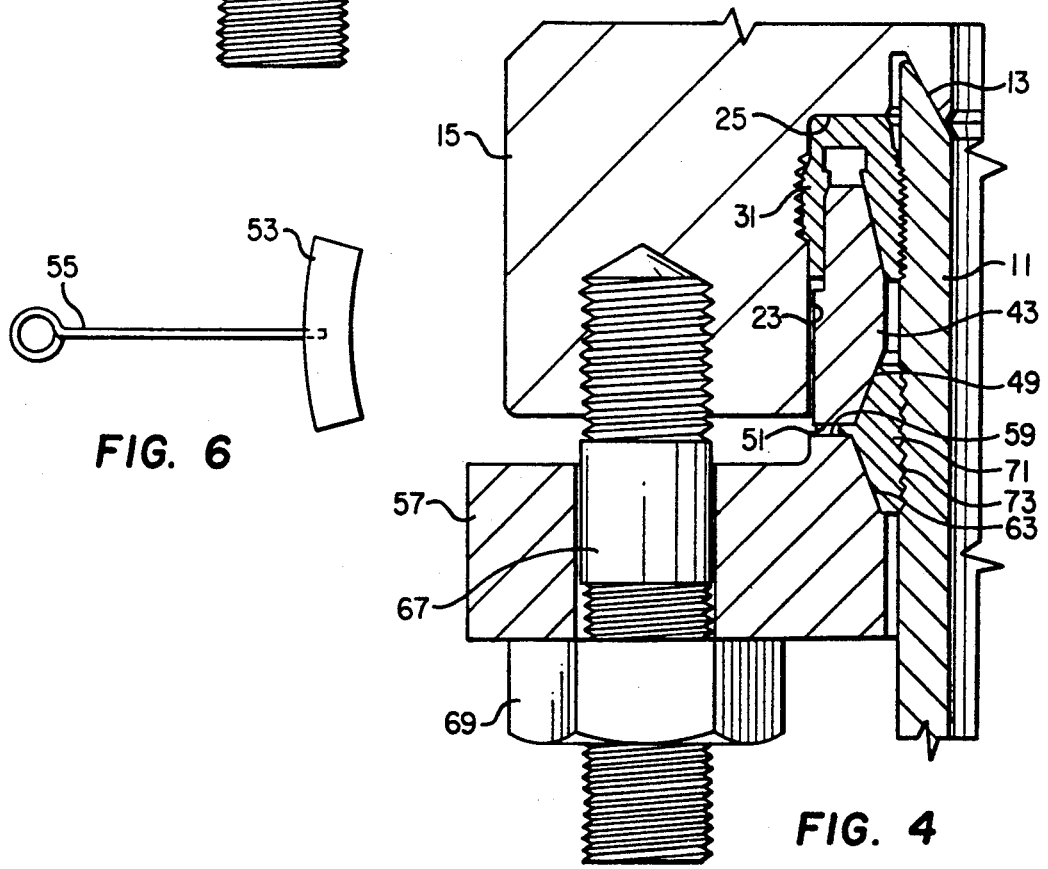
FIG. 6
FIG. 4

WELL STARTER HEAD

CROSS REFERENCE TO RELATED APPLICATION

This application is a continuation-in-part of application Ser. No. 634,465, filed Dec. 27, 1990, now abandoned.

BACKGROUND OF THE INVENTION

1. Field of the Invention

This invention relates in general to connecting tubular members together, and in particular to an apparatus and method for connecting a starter head to surface casing of a well.

2. Description of the Prior Art

When drilling a well, surface casing will be set. The upper end of the surface casing will protrude above the surface. Often a starter head mounts to the upper end of the surface casing. Pressure equipment will be connected to the starter head.

Starter heads are connected to casing by various techniques, such as welding, threading, or hydraulic crimping. Hydraulic crimping requires expensive, specialized equipment. Welding is time consuming and may leak if not done properly. It is desirable to provide a means and method for connecting a starter head that requires no special equipment and is quickly accomplished.

SUMMARY OF THE INVENTION

In this invention, the starter head is provided with a lower end and an annular recess extending upward from the lower end. The starter head is placed over the casing, with the recess encircling the casing. A seal ring locates in the recess.

An actuating ring is carried below the lower end of the head. An energizing ring locates on the actuating ring and extends upward into the recess for engaging the seal ring. Means are connected to the actuating ring and the head for moving the actuating ring upward. This causes the actuating ring to push the energizing ring upward against the seal ring to seal the seal ring against the casing. Also, slips are carried by the actuating ring for gripping the casing.

In a second embodiment of the invention, the slips locate in a recess in the head. A slip actuating ring secures by bolts to the lower end of the head. A second recess is formed in the slip actuating ring. The seal locates in the second recess. Bolts will move a seal actuating ring upward after the slips are set and independently of the slips actuating ring.

BRIEF DESCRIPTION OF THE DRAWINGS

FIG. 3 is an enlarged partial view of the starter head of FIG. 1, showing the seal set, but the slips not yet in engagement.

FIG. 4 is an enlarged partial sectional view, similar to FIG. 3, but showing the seal set and the slips engaging the casing.

FIG. 6 is a top plan view of a spacer ring utilized with the starter head and shown in FIGS. 1 and 3.

DETAILED DESCRIPTION OF THE INVENTION

Figure 1:
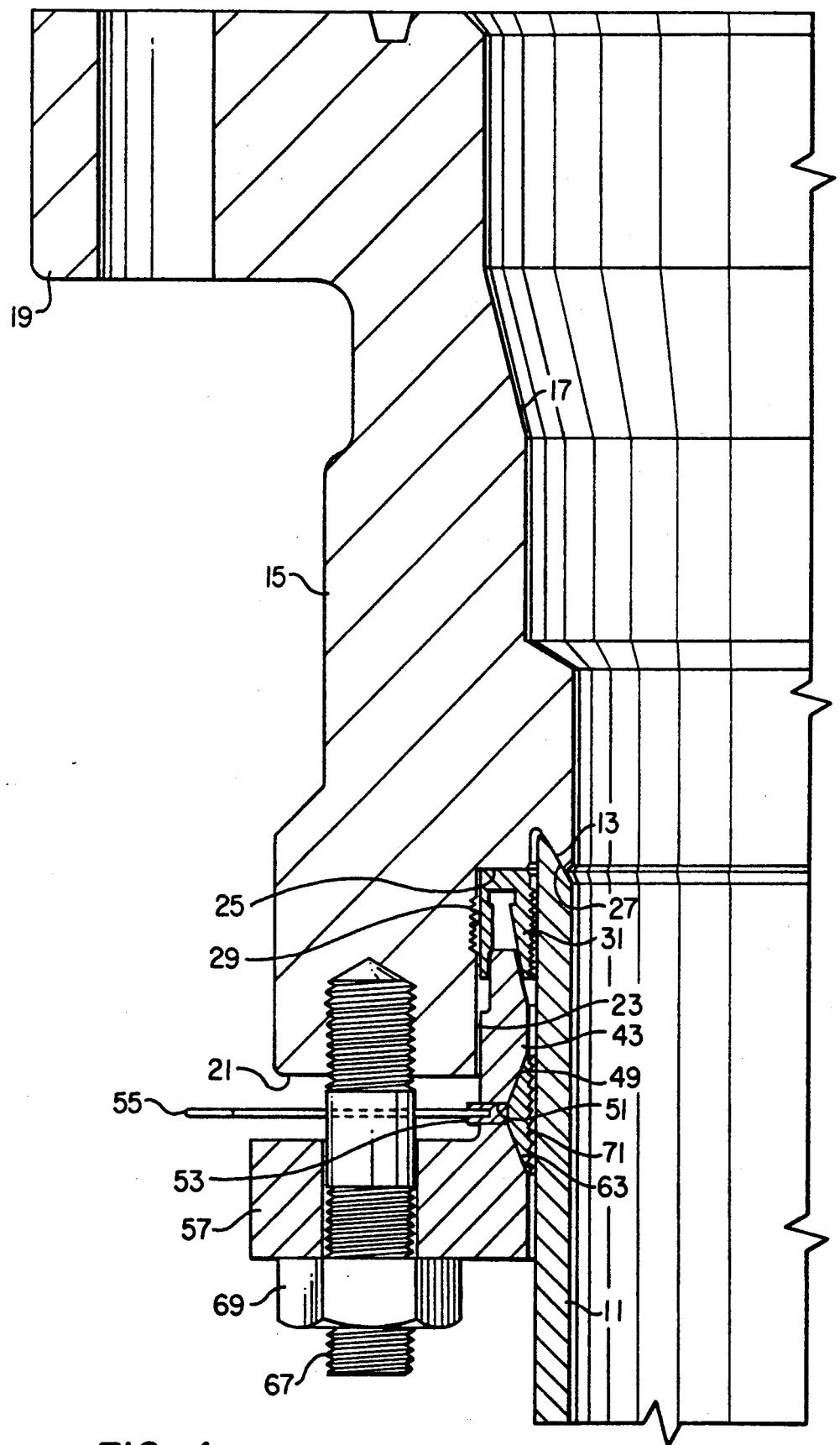
FIG. 1 is a quarter vertical sectional view of a starter head constructed in accordance with this invention, and shown prior to energizing the seal and the slips.

Referring to FIG. 1, casing 11 will protrude upward from a well (not shown). Casing 11 will be cut to produce a rim 13. Rim 13 is conical, and faces upward and inward.

A starter head 15 will mount to the casing 11. Starter head 15 is a tubular member having a longitudinal passage 17 therethrough. A radially extending flange 19 locates on the upper end of head 15. Head 15 has lower end 21 that encircles the casing 11.

An annular recess 23 is formed in the passage 17 at the lower end 21. Recess 23 is a counterbore extending upward from lower end 21, terminating in an upper end 25. A load bearing shoulder 27 also locates at the upper end 25. The load bearing shoulder 27 is conical and mates with the rim 13. A set of wickers 29 will be formed on the outer diameter of recess 23. Wickers 29 comprise small parallel grooves, each having a triangular shape.

Figure 2:
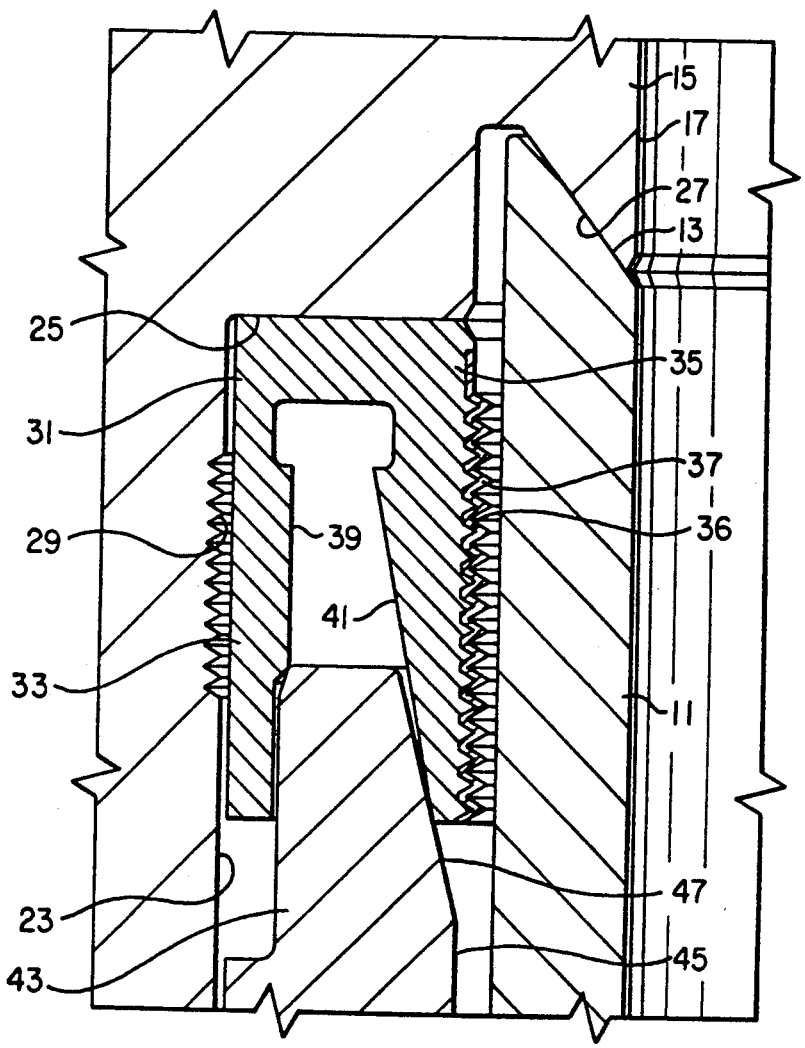
FIG. 2 is an enlarged partial view of the starter head of FIG. 1, showing the seal prior to being set.

A seal ring 31 will locate in recess 23 near the upper end 25. Seal ring 31 is preferably a metal seal. As shown in FIG. 2, seal ring 31 is in the shape of an inverted "U". It has an outer wall 33 and a parallel inner wall 35, with the walls 33, 35 being joined at the upper side of the seal ring 31. The exterior of outer wall 33 is smooth and cylindrical. When the seal ring 31 sets, the wickers 29 will embed into the outer wall 33, as shown in FIGS. 3 and 4. The exterior of outer wall 33 will permanently deform.

The inner diameter of inner wall 35 preferably contains a set of wickers 36. Wickers 36 have the same shape and size as wickers 29. A soft metal coating 37 coats the wickers 36 to enhance sealing. When the seal ring 31 is set, as shown in FIGS. 3 and 4, the wickers 36 will seal against the casing 11.

The material of the seal ring 31 is normally softer than the material of the casing 11. Alternately, all or some inner wickers 36 can be of a harder material, which will cause the wickers 36 to dig into the casing 11, both sealing and locking the casing 11 to the head 15. Also, some of the wickers 36 could be softer than the casing 11 and others harder. The softer wickers 36 allow for casing 11 defects, while the harder wickers 36 bite into casing 11 for holding the casing 11 in place.

A central annular cavity 39 separates the outer wall 33 from the inner wall 35. A tapered surface 41 is formed on one side of central cavity 39, the other side being cylindrical. The upper end of cavity 39 is closed. Because of tapered surface 41, cavity 39 has a larger cross sectional dimension on its open lower end than on its closed upper end.

Seal ring 31 is energized by an energizing or seal actuating ring 43. Seal actuating ring 43 locates below the seal ring 31. Seal actuating ring 43 will move from the initial position shown in FIG. 2 to the setting position shown in FIGS. 3 and 4. The upper end of seal actuating ring 43 extends into the central cavity 39 for wedging the walls 33, 35 apart when moved upward. Seal actuating ring 43 has an inner diameter 45 with an upper tapered portion 47. The upper tapered portion 47 engages the central cavity tapered wall 41. The other side of seal actuating ring 43 is cylindrical.

Referring again to FIG. 1, seal actuating ring also has a lower tapered portion 49 in its inner diameter 45. Lower tapered portion 49 extends upward from lower end 51 of seal actuating ring 43. Lower tapered portion 49 is conical, and faces downward and inward.

During the installation procedure, the seal actuating ring 43 will rest on a number of spacer members 53 (only one shown). Each spacer member 53 is an arcuate segment, as shown in FIG. 6. A handle 55 connects to spacer member 53 to serve as means to remove the spacer member 53 from the assembly. The spacer member 53 will be removed during the final installation procedure, as shown in FIG. 4.

During initial assembly, the spacer member 53 rests on a slips actuating ring 57. Slips actuating ring 57 is mounted below the lower end 21 of head 15. Slips actuating ring 57 has an upper side 59 (FIG. 3) that supports the spacer member 53 during initial assembly. The spacer member 53 will separate the slips actuating ring 57 from the seal actuating ring 43, and cause the seal actuating ring 43 to move upward in unison with the slips actuating ring 57.

Slips actuating ring 57 has an inner diameter 61 that is slightly greater than the outer diameter of casing 11. A tapered portion 63 is formed in the inner diameter 61, beginning at the upper end 59. Tapered portion 63 is conical, preferably with the same degree of taper as the seal actuating ring tapered portion 49. Tapered portion 63 faces upward and inward.

The assembly includes means for forcing the slips actuating ring 57 upward toward the head 15. This includes a plurality of holes 65 through which bolts 67 pass (only one shown). Each bolt 67 is engaged by a nut 69 on the lower side of slips actuating ring 57. The bolts 67 and nuts 69 will be spaced circumferentially around the slips actuating ring 57. Each bolt 67 screws into a threaded hole provided in the lower end 21 of the head 15. Tightening the nuts 69 will move the slips actuating ring 57 toward the lower end 21.

Figure 5:
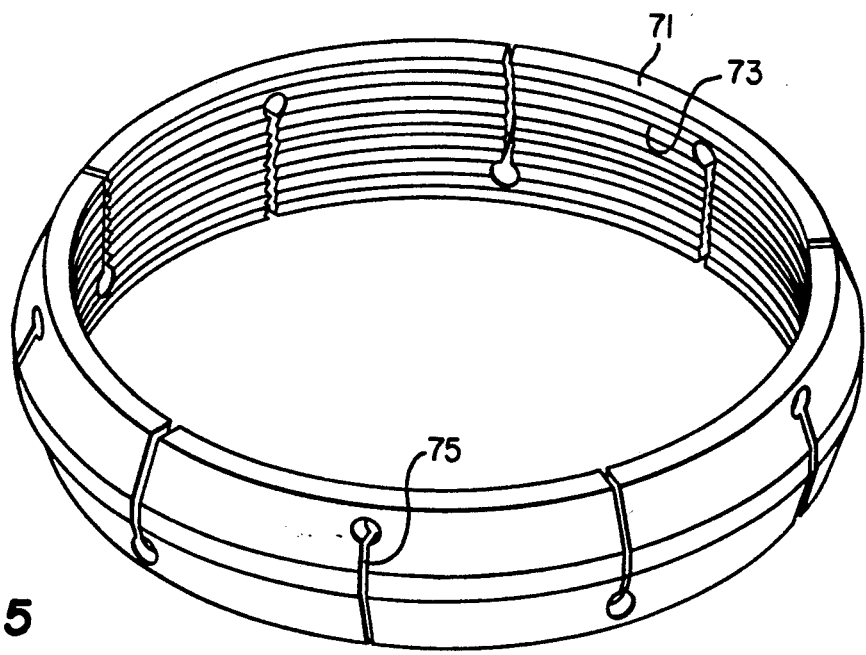
FIG. 5 is a perspective view illustrating the slips of FIG. 1.

The assembly includes slips 71 for gripping the casing 11. Slips 71 preferably is a single, annular ring, as illustrated also in FIG. 5. A plurality of teeth 73 extend circumferentially around the inner diameter of slip 71. A number of axial slots 75 are spaced around the circumference of slips 71. The slots 75 extend alternately from the upper side and from the lower side of slips 71. The slots 75 enable the slips 71 to contract from the position shown in FIGS. 1 and 3 to that shown in FIG. 4.

Slips 71 has an outer diameter that is tapered on the upper and lower portions for matching the tapered portions 49 and 63. The tapered portions 49, 63 define a recess for receiving the slips 71. In the release position, as shown in FIGS. 1 and 3, the teeth 73 will be located radially outward from the casing 11. When the spacer members 53 are removed, upward movement of the slips actuating ring 57 relative to the seal actuating ring 43 will wedge the slips 71 radially inward to grip the casing 11.

In operation, the operator will first cut the casing 11 and form a bevel at rim 13. The operator will assemble the head 15 with the seal ring 31, seal actuating ring 43 and slips actuating ring 57. The spacer members 53 will be located between the slips actuating ring 57 and the seal actuating ring 43. The operator will place the assembly on the casing 11 as shown in FIG. 1.

Then, the operator will begin tightening the nuts 69. This causes the slips actuating ring 57 and seal actuating ring 43 to move upward in unison relative to the head 15. The seal actuating ring 43 will deform the seal ring 31, causing it to seal as shown in FIG. 3. The slips 71 will not engage the casing 11 at this point because there will be no relative movement between the slips actuating ring 57 and seal actuating ring 43. The spacer member 53 serves as delay means for delaying actuation of the slips 71 until the seal ring 31 fully sets.

Then, the operator will remove the spacer members 53 by pulling the handles 55 outward. He then rotates the nuts 69 again. This will cause the slips actuating ring 57 to move upward. The seal actuating ring 43, however, will not move upward as it will be fully wedged against the seal ring 31. The relative movement between the tapered portions 49 and 63 results in wedging action on the slips 71. The slips 71 will move radially inward. The teeth 73 will grip the casing 11, securing the assembly in place.

Figure 7:
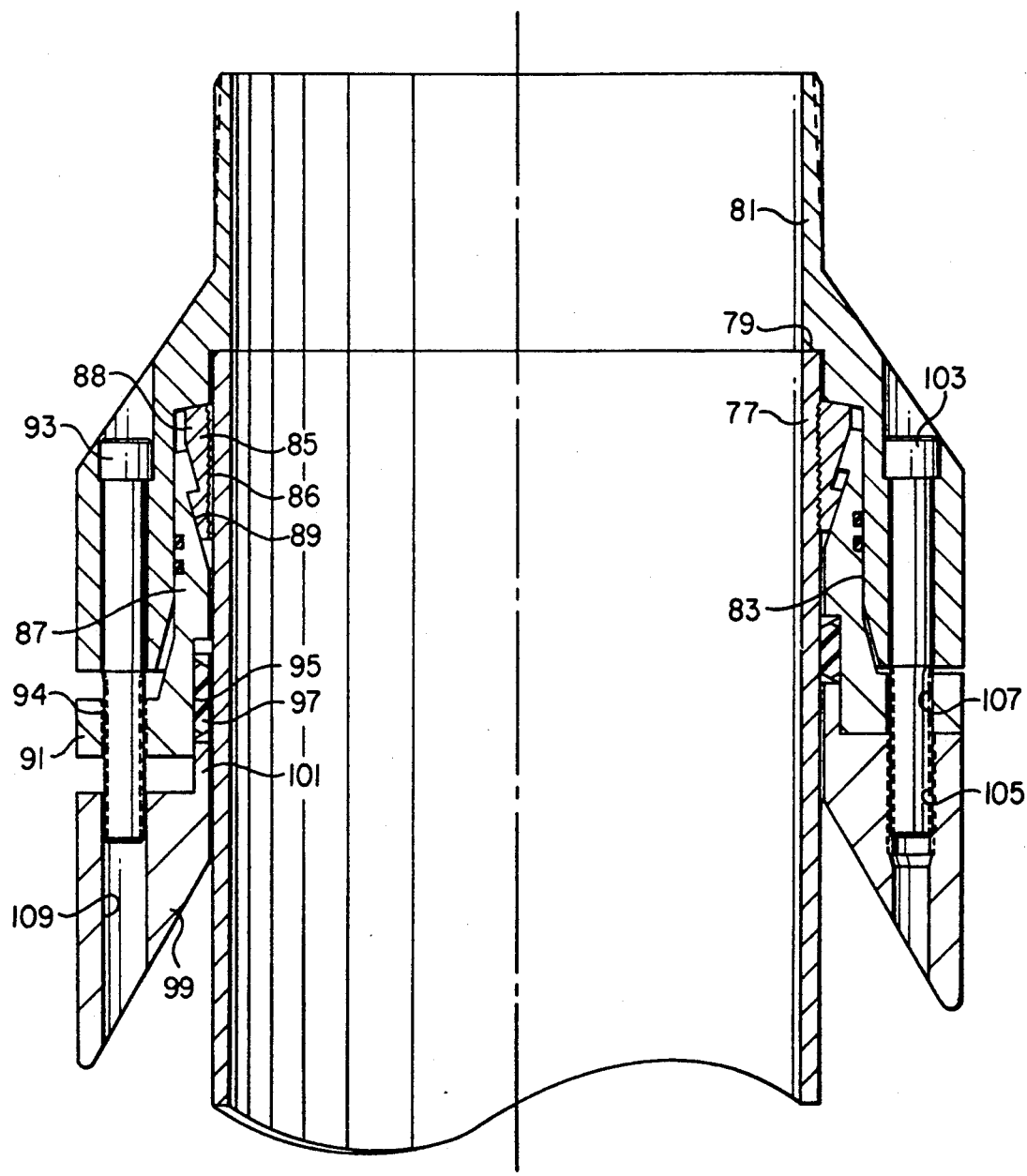
FIG. 7 is a sectional view illustrating a second embodiment of a starter head constructed in accordance with this invention, with the left side of the drawing being shown prior to setting and the right side after setting.

FIG. 7 illustrates a second embodiment of the invention. In FIG. 7, casing 77 has a rim 79 on which a head 81 lands. Head 81 has an annular recess 83 that will extend between casing 77 and head 81.

A set of slips 85 locate in recess 83. Slips 85 preferably comprise a C-ring, having teeth 86 on the inner diameter and conical surfaces 88 on the outer diameter. Slips 85 will move from an expanded position shown on the left side of FIG. 7 to a contracted position shown on the right side of FIG. 7. In the contracted position, teeth 86 will grip casing 77.

Slips 85 are actuated by a slips actuating ring 87. Slips actuating ring 87 has a bowl 89 on its upper end that mates with the conical surfaces 88 on slips 85. Slips actuating ring 87 has a flange 91 on its lower end that extends below the lower end of head 81.

A plurality of slips bolts 93 extend through holes in the head 81 and engage a threaded hole 94 in the flange 91. Rotating slips bolts 93 in one direction will cause the slips actuating ring 87 to move upward. The bowl 89 will wedge the slips 85 into gripping engagement with casing 77.

Slips actuating ring 87 has a recess 95 located on its lower end. Recess 95 encircles casing 77. A seal ring 97, shown to be elastomeric in FIG. 7, locates in recess 95.

A seal actuating ring 99 will energize seal ring 97 to cause it to seal against casing 77. Seal actuating ring 99 has a neck 101 that extends upward into recess 95. Neck 101 will push upward against seal ring 97 to cause it to seal.

A plurality of seal bolts 103 extend through head 81 into threaded holes 105 in the seal actuating ring 99. Seal bolts 103 pass through holes 107 in the slips actuating ring 87, but do not engage the threads in slips actuating ring 87. Similarly, slips bolts 93 extend into holes 109 in the seal actuating ring 99, but do not engage any threads in seal actuating ring 99. Seal bolts 103 are spaced circumferentially around head 81, and alternately spaced with the slips bolts 93. Rotating seal bolts 103 in one direction will cause the seal actuating ring 99 to move upward.

In the operation of the embodiment of FIG. 7, after the head 81 is placed on the casing 77, the operators will rotate the slips bolts 93. This moves the slips actuating ring 87 upward to cause the slips 85 to grip the casing 77. The movement of the slips actuating ring 87 is independent of any movement of the seal actuating ring 99, which remains stationary.

Then, the operator will rotate the seal bolts 103. This causes the seal actuating ring 99 to move upward while the slips actuating ring 87 remains stationary. The neck 101 will press the seal ring 97 into sealing engagement with casing 77.

The invention has significant advantages. The starter head can be assembled without the need for any special tools. No welding or hydraulic crimping will be necessary. The seal can be metal-to-metal. The assembly is quick and simple to install.

While the invention has been shown in only one of its forms, it should be apparent to those skilled in the art that it is not so limited, but is susceptible to various changes without departing from the scope of the invention.

We claim:

1. A connector for a tubular member, comprising in combination:
   a tubular head having an end and an annular first recess extending from the end, the head adapted to be placed over the tubular member, with the first recess encircling the tubular member;
   a slips actuating ring;
   a seal actuating ring;
   an annular recess located in one of the actuating rings and adapted to encircle the tubular member;
   an annular seal ring carried in one of the recesses for sealing against the tubular member;
   slips carried in the other of the recess for gripping the tubular member;
   means for moving one of the actuating rings relative to the head to set fully a first one of the lips and the seal ring while a second one of the slips and the seal ring remains unset, then for setting said second one of the slips and seal ring while said first one remains stationary relative to the tubular member; and
   wherein the seal ring is set in the second recess and the slips in the first recess.

2. A connector for a tubular member having a rim on its upper end, comprising in combination:
   a tubular head having an axial passage therethrough, a lower end and an annular upper recess located in the passage and extending upward from the lower end, the head adapted to be placed over the tubular member, with the upper recess encircling the tubular member;
   a slips actuating ring;
   a seal actuating ring;
   a lower recess located in one of the actuating rings and adapted to encircle the tubular member;
   an annular seal ring located in one of the recesses;
   slips located in the other of the recess;
   slips bolt means connected between the slips actuating ring and the head for moving the slips actuating ring relative to the head and while the seal actuating ring remains stationary by rotation of the slips bolt means to cause the slips to grip the tubular member;
   seal bolt means connected between the head and the seal actuating ring for moving the seal actuating ring relative to the head to set the seal ring by rotation of the seal bolt means while the slips actuating ring remains stationary; and
   wherein the slips are located in the upper recess and the seal ring in the lower recess.

3. A connector for a tubular member having a rim on its upper end, comprising in combination:
   a tubular head having an axial passage therethrough, a lower end and an annular upper recess located in the passage and extending upward from the lower end, the head adapted to be placed over the tubular member, with the upper recess encircling the tubular member;
   a slips actuating ring;
   a seal actuating ring;
   a lower recess located in one of the actuating rings and adapted to encircle the tubular member;
   an annular seal ring located in one of the recesses;
   slips located in the other of the recess;
   slips bolt means connected between the slips actuating ring and the head for moving the slips actuating ring relative to the head and while the seal actuating ring remains stationary by rotation of the slips bolt means to cause the slips to grip the tubular member;
   seal bolt means connected between the head and the seal actuating ring for moving the seal actuating ring relative to the head to set the seal ring by rotation of the seal bolt means while the slips actuating ring remains stationary; and wherein:
   the slips are located in the upper recess;
   the seal ring is located in the lower recess; and
   the slips actuating ring is located above the seal actuating ring.

4. A connector for a tubular member having a rim on its upper end, comprising in combination:
   a tubular head having an axial passage therethrough, a lower end and an annular upper recess located in the passage and extending upward from the lower end, the head adapted to be placed over the tubular member, with the upper recess encircling the tubular member;
   a slips actuating ring;
   a seal actuating ring;
   a lower recess located in one of the actuating rings and adapted to encircle the tubular member;
   an annular seal ring located in one of the recesses;
   slips located in the other of the recess;
   slips bolt means connected between the slips actuating ring and the head for moving the slips actuating ring relative to the head and while the seal actuating ring remains stationary by rotation of the slips bolt means to cause the slips to grip the tubular member;
   seal bolt means connected between the head and the seal actuating ring for moving the seal actuating ring relative to the head to set the seal ring by rotation of the seal bolt means while the slips actuating ring remains stationary; and wherein:
   the slips are located in the upper recess;
   the seal ring is located in the lower recess;
   the slips actuating ring is located above the seal actuating ring; and
   the lower recess is located in the slips actuating ring.

5. A connector for a tubular member having a rim on its upper end, comprising in combination:
   a tubular head having an axial passage therethrough, a lower end and an annular upper recess located in the passage and extending upward from the lower end, the head adapted to be placed over the tubular member, with the upper recess encircling the tubular member and the load bearing shoulder landed on the rim;

a slips actuating ring;

a seal actuating ring located below the slips actuating ring;

a lower recess located in a lower end of the slips actuating rings and adapted to encircle the tubular member;

an annular seal ring located in the lower recess;

slips located in the upper recess;

slips bolt means connected between the slips actuating ring and the head for moving by rotation of the slips bolt means the slips actuating ring relative to the head and while the seal actuating ring remains stationary, to cause the slips to grip the tubular member; and seal bolt means connected between the head and the seal actuating ring for moving the seal actuating ring relative to the head by rotation of the seal bolt means after the slips bolt means has fully set the slips and while the slips actuating ring remains stationary to set the seal ring.

6. The connector according to claim 5 wherein the slips bolt means comprises a plurality of bolts spaced circumferentially around the head, and wherein the seal bolt means comprises a plurality of bolts spaced circumferentially around the head alternately with the slips bolts means.

* * * * *